United States Patent
Narasimhan et al.

(10) Patent No.: US 6,907,444 B2
(45) Date of Patent: Jun. 14, 2005

(54) SYSTEM AND METHOD TO AUTOMATICALLY OBTAIN A SERVICE

(75) Inventors: Sangeetha Narasimhan, Boise, ID (US); Lori Clifton, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 512 days.

(21) Appl. No.: 09/954,666

(22) Filed: Sep. 12, 2001

(65) Prior Publication Data

US 2003/0050968 A1 Mar. 13, 2003

(51) Int. Cl.[7] .............................................. G06F 15/16
(52) U.S. Cl. ..................... 709/200; 709/203; 709/217; 709/219
(58) Field of Search ............................... 709/200, 203, 709/217, 219, 201

(56) References Cited

U.S. PATENT DOCUMENTS

| | | | |
|---|---|---|---|
| 5,533,174 A | * | 7/1996 | Flowers et al. ............ 358/1.15 |
| 5,564,051 A | * | 10/1996 | Halliwell et al. ........... 707/200 |
| 5,793,966 A | * | 8/1998 | Amstein et al. ............ 709/203 |
| 5,889,942 A | * | 3/1999 | Orenshteyn ................. 709/203 |
| 6,073,147 A | * | 6/2000 | Chan et al. ................. 715/542 |
| 6,269,377 B1 | * | 7/2001 | Collie et al. ............ 707/103 R |
| 6,657,625 B1 | * | 12/2003 | Chik et al. ................. 345/467 |

FOREIGN PATENT DOCUMENTS

WO    WO99/44134    9/1999

OTHER PUBLICATIONS

Guttman E. et al. "RFC 2608—Service Location Protocol, Version 2"; IETF RFC, Jun. 1999, XP002193190; retrieved Mar 14, 2002. Available: http://www.ietf.org/rfc/rfc2608.txt.
"Jini Architectural Overview". Sun Microsystems Lab. Tech. Report, XX, XX, Jan. 1999, pp. A, 1–21, XP002941302.

* cited by examiner

Primary Examiner—Zarni Maung
Assistant Examiner—Hassan Phillips

(57) ABSTRACT

A system, method, and program embodied in a computer readable medium are provided for obtaining a service. For example, the method comprises the steps of identifying a service needed to perform a processing function in a processor based system coupled to a network, and, searching at least one remote device on the network for the service to perform the processing function.

13 Claims, 4 Drawing Sheets

SYSTEM AND METHOD TO AUTOMATICALLY OBTAIN A SERVICE

TECHNICAL FIELD

The present invention is generally related to the field of network applications and, more particularly, is related to a system and method for obtaining a service on a network.

BACKGROUND OF THE INVENTION

With the proliferation of personal computers and the advent of the Internet, the number of services and applications that are available to the public have increased dramatically. Specifically, software applications and services are available from a number of locations and online via the Internet that may be executed in the average user's personal computer, etc.

For example, many different software applications exist that may be used to print or otherwise render documents. Such applications often allow a user to create a digital document that is stored in a memory. The specific digital format of the digital document is often a proprietary format that is compatible with the specific application employed in its creation. For example, one may create digital documents using software packages such as Microsoft Word created by Microsoft Corporation of Redmond, Wash. or Adobe Acrobat created by Adobe Systems, Inc., of San Jose, Calif.

Given that there are many different formats in which digital documents or other files may be embodied, it sometimes happens that a user may have access to such documents or other files on their computer system without the corresponding application necessary to render the digital document or other file for printing or viewing, etc. For example, a user may receive such a document or other file as an attachment over the Internet via electronic mail. When the corresponding application is not installed on the user's computer, a user may be prevented from rendering or otherwise accessing and exploiting the specific document or file for print, viewing, or other operation, etc.

Also, in some situations, a user may not have an up-to-date version of an application on their computer system. For example, in printing documents, often a driver is employed by a computer system to communicate with a printer and to perform other printing operations. From time to time a more recent version of a driver currently employed by a user's computer system may be available. However, unless the user manually performs the actions necessary to obtain the more recent version of the driver, the older driver will continually be used. Consequently, a user may not receive any benefits associated with the newer version of the driver.

SUMMARY OF THE INVENTION

In view of the foregoing, the present invention provides for a system, method, and program embodied in a computer readable medium for obtaining a service. In one embodiment, the method comprises the steps of identifying a service needed to perform a processing function in a processor based system coupled to a network, and, searching at least one remote device on the network for the service to perform the processing function.

In another embodiment, the present invention provides for a program stored on a computer readable medium for obtaining a service. In this regard, the program comprises code that identifies a service needed to perform a processing function in a processor-based system coupled to a network, and, code that searches at least one remote device on the network for the service to perform the processing function.

In still another embodiment, a system for obtaining a service is provided. In this respect, the system comprises means for identifying a service needed to perform a processing function in a processor-based system coupled to a network. The system also includes means for searching at least one remote device on the network for the service to perform the processing function.

BRIEF DESCRIPTION OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION OF THE INVENTION

Figure 1:
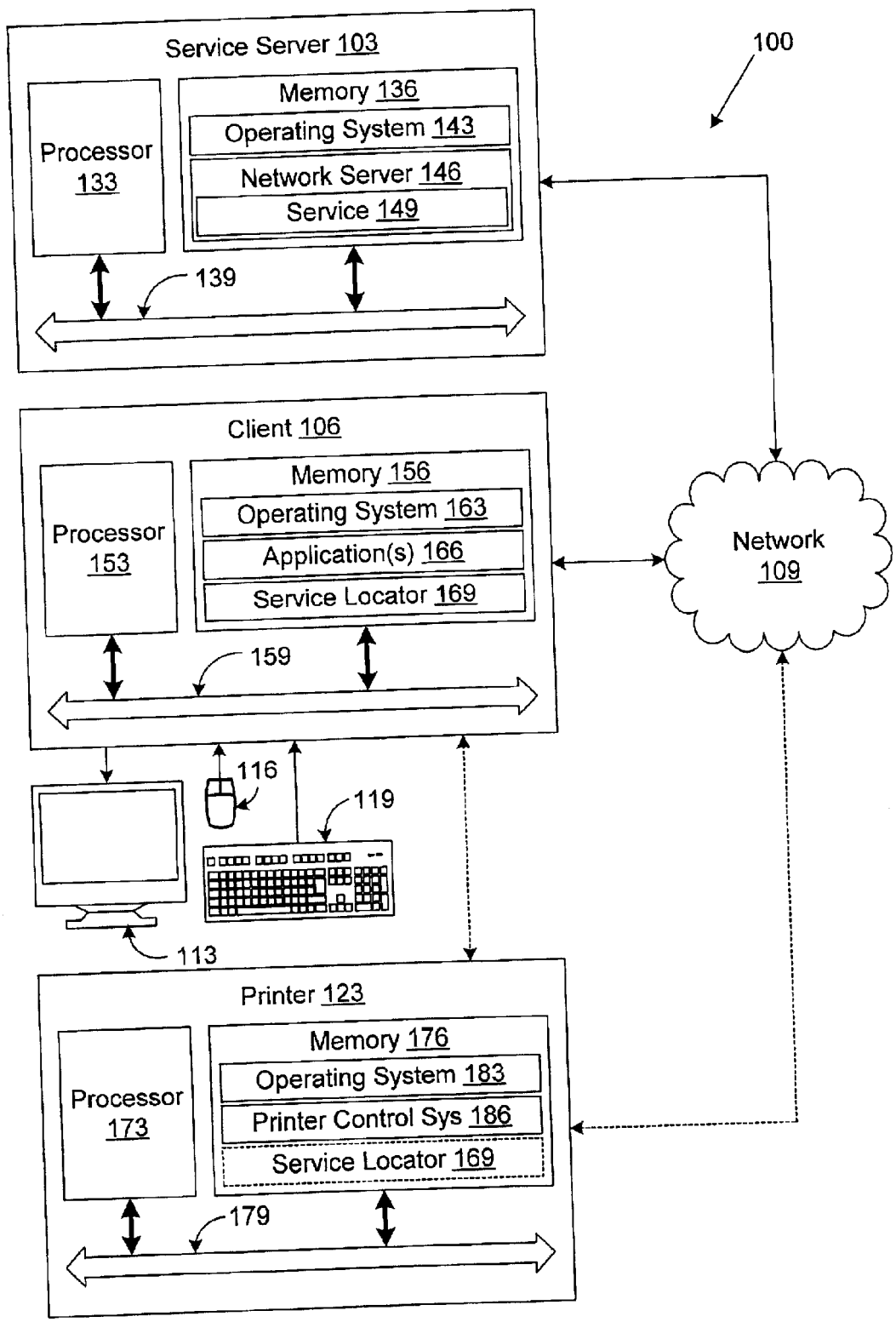
FIG. 1 is a drawing of a data communications network that employs a service locator according to an aspect of the present invention.

With reference to FIG. 1, shown is a data communications network 100 according to an aspect of the present invention. The data communications network 100 includes a service server 103 and a client 106, both of which are coupled to a network 109. In this respect, the service server 103 and the client 106 may comprise, for example, computer systems such as processor based systems or systems with like capability as can be appreciated by those with ordinary skill in the art.

The network 109 includes, for example, the Internet, Intranets, wide area networks (WANs), local area networks (LANs), wireless networks, or other suitable networks, etc., or any combination of two or more such networks. The service server 103 and the client 106 are coupled to the network 109 to facilitate data communication to and from each other via the network 109 as is generally known by those of ordinary skill in the art. For example, both the service server 103 and the client 106 may be linked to the network 109 using various devices such as, for example, network cards, modems, or other communications devices.

The client 106 includes a display device 113, a mouse 116, a keyboard 119, and a printer 123. The display device 113 may be, for example, a cathode ray tube (CRT), a liquid crystal display screen, a gas plasma-based flat panel display, or other suitable display device. The printer 123 may be either a local printer coupled directly to the client 106 or a network printer coupled directly to the network 109, etc. Also, other peripheral devices may be employed with the client 106 such as, for example, a keypad, touch pad, touch screen, microphone, scanner, joystick, or one or more push buttons, indicator lights, speakers, as well as other devices as can be appreciated by those with ordinary skill in the art. The server 103 may also include all peripheral devices that are employed with the client 106.

The service server 103 includes a processor circuit having a processor 133 and a memory 136, both of which are coupled to a local interface 139. In this respect, the local interface 139 may be a data bus with an accompanying control/address bus as is generally understood by those with ordinary skill in the art. In this manner, the service server 103 is a processor-based system as can be appreciated by those with ordinary skill in the art. Stored on the memory 136 and executable by the processor 133 are an operating system 143 and a network server 146. The network server 146 may be, for example, a web server or similar device as can be appreciated by those with ordinary skill in the art. The network server 146 serves up a "service" 149 to requesting clients 106 as will be discussed.

The client 106 also includes a processor circuit having a processor 153 and a memory 156, both of which are coupled to a local interface 159. In this respect, the local interface 159 may be, for example, a data bus with an accompanying control/address bus as can be appreciated by those with ordinary skill in the art. Thus, the client 106 is a processor-based system as can be appreciated by those with ordinary skill in the art. Stored on the memory 156 and executable by the processor 153 are an operating system 163, one or more applications 166, and a service locator 169. The operation of the operating system 163, applications 166, and the service locator 169 will be described.

The printer 123 also includes a processor circuit with a processor 173 and a memory 176, both of which are coupled to a local interface 179. The local interface 179 may be, for example, a data bus with an accompanying control/address bus as can be appreciated by those with ordinary skill in the art. In this respect, the printer 123 is a processor-based system as can be appreciated by those with ordinary skill in the art. Stored on the memory 176 and executable by the processor 173 are an operating system 183 and a printer control system 186. The service locator 169 may also be located within the printer 123 in the event that the printer 123 is a network capable printer 109.

Each of the memories 136, 156, and 176 may include both volatile and nonvolatile memory components. Volatile components are those that do not retain data values upon loss of power. Nonvolatile components are those that retain data upon a loss of power. Thus, each of the memories 136, 156, and 176 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each of the processors 133, 153, and 173 may represent multiple processors and each of the memories 136, 156, and 176 may represent multiple memories that operate in parallel processing circuits, respectively. In such a case, each of the local interfaces 139, 159, and 179 may be an appropriate network that facilitates communication between any two of the multiple processors, between any processor and any of the memories, or between any two of the memories, etc. The processors 133, 153, and 173 may be electrical or optical in nature.

The operating systems 143, 163, and 183 are executed to control the allocation and usage of hardware resources in the service server 103, client 106, and the printer 123, respectively. Specifically, the operating systems 143, 163, and 183 control the allocation and usage of various portions of the memories 136, 156, and 176, processing time, and the peripheral devices as well as performing other functionality. In this manner, the operating systems 143, 163, and 183 serve as the foundation on which applications depend as is generally known by those with ordinary skill in the art.

Next an overview of the operation of the various components of the data communications network 100 is provided. Before the discussion of the operation however, first a definition of the "service" 149 is provided. In particular, the service 149 as described herein includes various software or other services including applications that may be implemented in the client 106, the service server 103, or the printer 123. For example, the service 149 may be a particular application 166 or portion of an application 166. In particular, assume that the application 166 is a word processor. In order to print a document, then the service 149 might be a driver or font that is employed by the word processor in printing the document on the printer 123. In other circumstances, the service 149 may include any type of program or application available via the network 109 on the service server 103. In particular, the service 149 may comprise, for example, any online application that may be accessed by the client 106 to perform a specific task. For example, the service 149 may include a translation service that automatically translates text in one language to another. The service 149 may also include the functionality necessary to convert various files from one format to a second format as can be appreciated by those with ordinary skill in the art.

The service 149 is described herein in the context of various scenarios in which the service 149 is either downloaded, installed, and executed in the client 106, or executed in the service server 103 and accessed by the client 106. In the first scenario, assume that the client 106 is to perform a particular task for which a software component is not available in the memory 156. For example, a user of the client 106 may wish to print a document on the attached printer 123, however, the client 106 may not have the needed driver to render the document in a format native to the printer 123. Alternatively, the document to be printed may include fonts that are not included within the client 106 and, therefore, can not be printed accordingly.

In this context, the service 149 may be the driver or the font(s) necessary to print the document. Such a service 149 must be obtained and installed on the client 106 so that the client 106 may properly print the document. To accomplish this task, the client 106 is provided with the service locator 169. The service locator 169 searches the service server 103 to obtain the service 149 therefrom. In this respect, the service server 103 is representative of a number of servers that are coupled to the network 109 that may be searched accordingly. In performing the search function, the service locator 169 may consult a lookup table that maps a desired service 149 to the respective uniform resource indicators (URI) of the various service servers 103 upon which the service 149 may be located. By consulting the lookup table, the service locator 169 identifies the servers 103 that are to be searched in order to find the needed service 149. The lookup table may be created and stored prior to the execution of the service locator 169.

In a second scenario, the client 106 includes an application 166 or service 149 in the memory 156 that may be out of date. For example, assume that a user of a client 106 wishes to print a document. Also assume that the service 149 is the needed printer driver to render the document into the native language for the printer. In this scenario, the client 106 includes an old version of the needed printer driver that is out of date in that a later version of the same driver is available and stored on the service server 103. In such case, the service locator 169 first determines the revision date of the current version of the driver stored in the client 106. Then, the service locator 169 performs a search of the service server 103 to determine whether a later version of the same driver or service is stored thereon. If a later version of the service 149 is found on the service server 103, then the service locator 169 downloads the new version of the driver and installs it in the client 106 for future use in printing documents.

In this manner, updates of any kind of service 149 may be downloaded from a respective service server 103 and installed in the client 106 in an automated fashion. Note that in determining which service server 103 among all those available in the network 109 to search to find the later version of the service 149, the service locator 169 may consult a lookup table stored within the memory 156 of the client 106. This lookup table maps the desired service 149 to uniform resource indicators (URIs) of respective service servers 103 that are known to potentially provide updated versions of various services 149 that are sought. Consequently, the search for the service 149 on the network 109 is not performed in a random manner.

With reference to FIGS. 2A–D, shown is a flow chart of the service locator 169 according to an aspect of the present invention. Alternatively, the flow charts of FIGS. 2A–D may be viewed as steps in a method implemented in the client 106 or in the printer 123 where the service locator 169 is installed therein.

Beginning with block 203, the service locator 169 determines whether a service 149 (FIG. 1) is needed in the client 106 (FIG. 1). In this respect, the execution of the service locator 169 may be implemented a separate application 166 (FIG. 1) in the client 106. Such may be the case, for example, when it is desirable to check to see if any later revisions of a respective service in the client 106 are available on a respective service server 103 (FIG. 1). Alternatively, the service locator 169 may be executed when the user attempts to implement a function in the client 106 that the client 106 does not have. Such may be the case, for example, when a user attempts to access a data file or other file that requires a specific application 166 that is not present on the client 106.

As another alternative, a user may implement the function of the service locator 169 manually or the service locator 169 may be configured for periodic execution as can be appreciated by those with ordinary skill in the art. In any event, it is assumed that the service locator 169 is executed when the client 106 is coupled to the network 109 to facilitate data communications with the service server 103. Alternatively, the same can be said of the printer 123 if the service locator 169 is located therein.

Assuming that a service is needed, then the service locator 169 proceeds to box 206 in which the type of service that is needed is determined. For example, in the case that a document is to be printed, then the service locator 169 determines the various processing functions that are necessary to perform the printing task. Specifically, for example, all of the fonts on the document need be identified and located within the client 106 in order to render the document in form necessary for printing. In this respect, the service locator 169 attempts to locate all of the fonts within the memory 156 that are necessary to print the document. This may be done, for example, by consulting a font directory to determine if the needed fonts are locally available in the client 106.

Alternatively, in another example, it may be the case that a printer driver is necessary to print the document on the respective printer 123. In this case, the service locator 169 attempts to identify the driver within the memory 156 that is to be executed in order to print the document. Such is especially the case when a multitude of drivers exists within the client 106 for various types of printers. Note that other tasks may be performed to determine precisely the services needed to ultimately perform the desired processing function.

Once the service locator 169 determines the service 149 that is necessary to perform the needed processing function, then the service locator 169 proceeds to box 209 in which it is determined whether the service 149 is locally available in the client 106 (i.e. stored in the memory 156). Then, in box 213, if the particular service 149 is locally available, then the service locator 169 proceeds to connector A as shown. Otherwise, the service locator 169 moves to box 216.

In box 216, the service locator 169 identifies a number of search locations that are associated with the respective service 149. The search locations may be, for example, uniform resource indicators (URI) of various servers 103 (FIG. 1) or other means of identifying the respective servers 103. Specifically, the search locations may be addresses on the network 109 that point to the respective servers 103 with which the client 106 may interface to determine what services 149 may be obtained therefrom. Note that the determination of the precise search locations that are associated with a respective service 149 may be identified by consulting a look up table that maps the respective services 149 with the search locations as can be appreciated by one with ordinary skill in the art.

Next, in box 219, the first search location associated with the desired service 149 is designated for searching. Thereafter, in box 223, the location is searched to determine whether the desired service 149 is stored thereon. Specifically, for example, where the service server 103 (FIG. 1) is a web server and assuming that the network 109 is the Internet, then the client 106 may generate hypertext transfer protocol (HTTP) requests designated at predefined URI's on the service server 149. Alternative, a web page that lists the various services 149 available on the service server 103 may be downloaded from the network server 146 contained therein.

In box 226, if the respective service 149 is found in the current search location, then the service locator 169 proceeds to connector B. Otherwise, the service locator 169 proceeds to box 229 in which it is determined whether the last search location associated with the desired service 149 has been searched. If not, then the service locator 169 proceeds to box 233 in which the next search location is designated for searching. Thereafter, the service locator 169 reverts back to box 223 as shown. However, if it is determined that the last search location has been searched in box 229, then the service locator 169 proceeds to connector C.

Figure 2A:
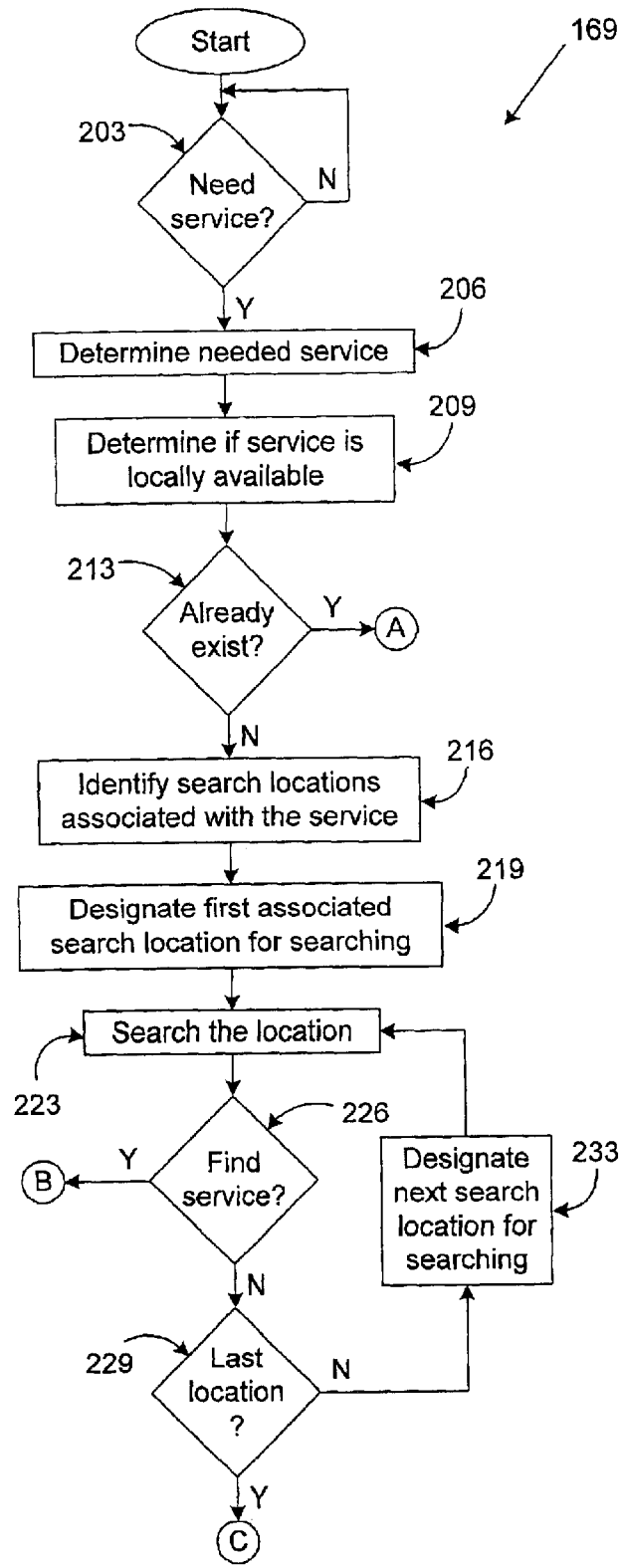
FIGS. 2A–D depict a flow chart of the service locator of FIG. 1.
Figure 2B:
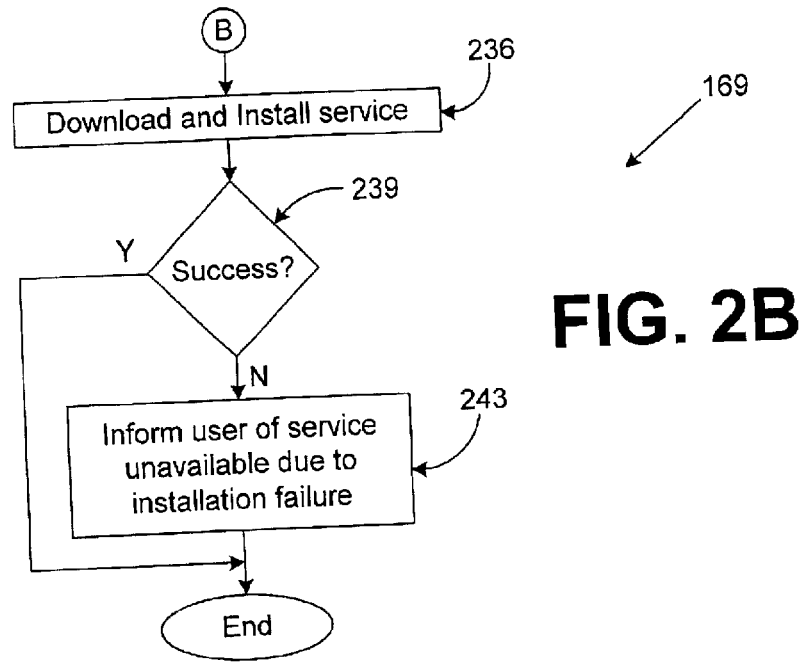

With reference to FIG. 2B, shown are further functions of the service locator 169 when a service 149 is discovered on a respective service server 103 (FIG. 1) in box 226 (FIG. 2A). In box 236, the newly discovered service 149 (FIG. 1) is downloaded from the service server 103 to the client 106 and installed on the client 106 for execution. Thereafter, in box 239, if the installation was successful then the service locator 169 ends accordingly. On the other hand, if the installation was unsuccessful then the service locator 169 proceeds to box 243 in which the user is informed that the service 149 is unavailable due to an installation failure or other problem. Thereafter, the service locator 169 ends, thereby preventing further attempts to obtain the service 149 from the same server 103.

Figure 2C:
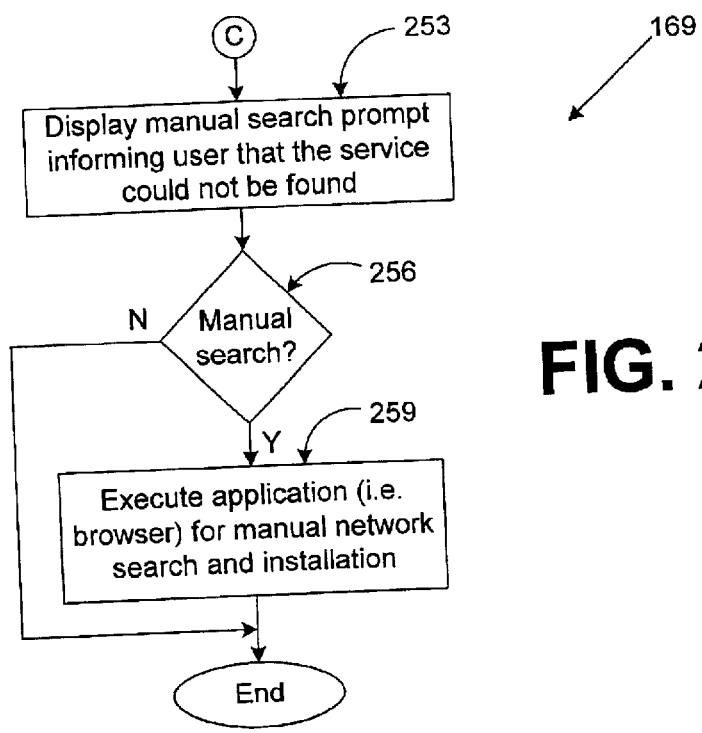

With reference to FIG. 2C, shown are further functions of the service locator 169 when the last search location has been searched in box 229 (FIG. 2A). Assuming that the last search location has been searched, then the service locator 169 proceeds to box 253 in which a manual search prompt is displayed in the display device 113 (FIG. 1). The manual search prompt informs the user that the respective service 149 could not be found in any of the associated service servers 103 specified in the lookup table stored in the client 106. The manual search prompt also provides an option to the user as to whether they wish to perform a manual search. In box 256, if the user indicates that they wish to perform a manual search, then the service locator 169 proceeds to box 259. Otherwise, the service locator 169 ends accordingly. In box 259, an appropriate application is executed in the client 106 to allow the user to perform a manual network search for the desired service 149. In this respect, the application may be, for example, a browser or other application that provides ability to search the network 109 in a manual fashion. Thereafter, the service locator 169 ends.

Figure 2D:
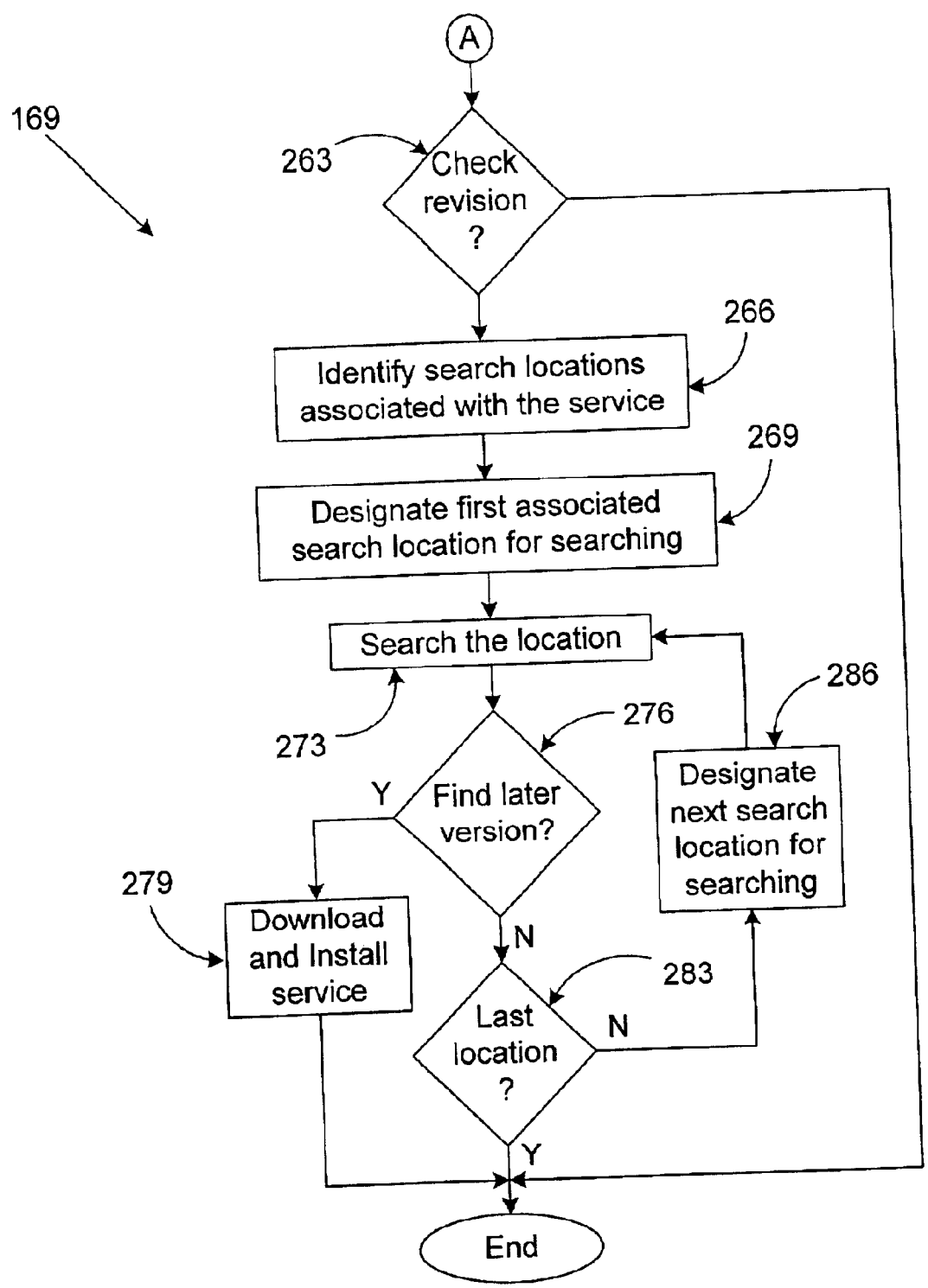

Referring next to FIG. 2D, shown are further functions of the service locator 169 according to an aspect of the present invention. Assuming that the service locator has determined that the desired service 149 is locally available in the client 106, then the service locator 169 proceeds to box 263 through connector A. A service 149 is locally available to the client 106, for example, if it is installed in the client 106 or otherwise may be accessed by the client 106 without performing a search therefor. In box 263, the service locator determines the precise revision date of the service 149 that is locally available to the client 106. This is done in order to have a revision date to compare with any potential later revision date of the same service 149 stored within the service server 103.

Thereafter, in box 266, the search locations that are associated with the desired service 149 are identified by use of, for example, a look up table or other means of storing the various search locations and associating them with the respective services 149. Then, in box 269, a first one of the associated search locations is designated for searching. Next, in box 273 the designated search location is searched by downloading respective directories and/or other information from the respective service server 103 corresponding with the respective search location. Note that the search locations searched are those in which it is known that potentially future revisions of the locally available service 149 are offered to the public or are otherwise made accessible. In box 276, if any version of the locally available service 149 found thereon is later than the version locally available to the client 106, then the service locator 169 proceeds to box 279 in which the later version is downloaded to the client 106 and installed thereon for future use. Thereafter, the service locator 169 ends.

However, in box 276, if a later version of the locally available service 149 is not found, then the service locator 169 proceeds to box 283. In box 283 it is determined whether the last search location has been searched. If not, then the service locator 169 reverts back to box 286 in which the next search location is designated for searching. Thereafter, the search locator 169 reverts to box 273. On the other hand, if the last search location has been searched in box 283, then the service locator 169 ends. In such case, the service 149 that is locally available to the client 106 is employed for the task that is to be performed.

Although the service locator 169 (FIGS. 1 and 2A–D) of the present invention is embodied in software or code executed by general purpose hardware as discussed above, as an alternative the service locator 169 may also be embodied in dedicated hardware or a combination of software/general purpose hardware and dedicated hardware. If embodied in dedicated hardware, the service locator 169 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow charts of FIGS. 2A–D show the architecture, functionality, and operation of an implementation of the service locator 169. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIGS. 2A–D show a specific order of execution, it is understood that the order of execution may differ from that which is depicted. For example, the order of execution of two or more blocks may be scrambled relative to the order shown. Also, two or more blocks shown in succession in FIGS. 2A–D may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention. Also, the flow charts of FIGS. 2A–D are relatively self-explanatory and are understood by those with ordinary skill in the art to the extent that software and/or hardware can be created by one with ordinary skill in the art to carry out the various logical functions as described herein.

Also, where the service locator 169 comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the service locator 169 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

What is claimed is:

1. A method for obtaining a font, comprising the steps of:
   examining a digital document in a printer to identify a font included therein, wherein the digital document is to be rendered by the printer, the printer being coupled to an Internet;
   determining if the font is available in the printer;
   implementing in the printer a search of at least one server on the Internet for the font in order to render the digital document if the font is unavailable in the printer by:
      consulting a lookup table in the printer, the lookup table identifying at least one universal resource locator (URL) of the at least one server on the Internet; and
      searching the at least one server to determine if the font is located on the at least one server;
      automatically downloading the font from the at least one server if the font is found on the at least one server; and
      automatically attempting to install the font in the printer.

2. A program embodied on a computer readable medium for obtaining a font in a printer, comprising:
   code that examines a digital document in a printer to identify a font included therein, wherein the digital document is to be rendered by the printer, the printer being coupled to an Internet;
   code that determines if the font is available in the printer;
   code that implements in the printer a search of at least one server on the Internet for the font in order to render the digital document if the font is unavailable in the printer including:
      code that consults a lookup table in the printer, the lookup table identifying at least on universal resource locator (URL) of the at least one server on the Internet;
      code that implements a search of the at least one server from the printer to determine if the font is located on the at least one server;
      code that automatically downloads the font from the at least one server if the font is found on the at least one server;
      code that automatically attempts to install the font in the printer.

3. A system for obtaining a font in a printer, comprising:
   means for examining a digital document in a printer to identify a font included therein, wherein the digital document is to be rendered by the printer, the printer being coupled to an Internet;
   means for determining if the font is available in the printer;
   means for implementing in the printer a search of at least one server on the Internet for the font in order to render the digital document if the font is unavailable in the printer by;
      means for consulting a lookup table in the printer, the lookup table identifying at least one universal resource locator (URL) of the at least one server on the Internet;
      means for searching the at least one server to determine if the font is located on the at least one server;
      means for automatically downloading the font from the at least one server to the printer if the font is found on the at least one server; and
      means for automatically attempting to install the font in the printer.

4. A method for obtaining a service, comprising:
   identifying whether a font is stored in a font directory accessible by a processor based system in a printer, the font being included in a document to be rendered by the processor based system in the printer, the processor based system being coupled to an Internet;
   consulting a lookup table in the printer that identifies at least one universal resource locator (URL) of at least one server couple to the Internet a to be searched for the font when the font is not stored in the font directory;
   searching the at least one server on the Internet for the font to render the document when the font is not stored in the font directory;
   automatically downloading the font from the at least one server if the font is found thereon;
   automatically installing the font in the processor based system; and
   performing the rendering of the document in the printer using the font.

5. The method of claim 1, further comprising the steps of:
   presenting a manual search prompt on a display device associated with the processor based system upon a failure to locate the font on the at least one server; and
   executing an application to perform a manual Internet search for the font.

6. The program stored on the computer readable medium of claim 2, further comprising:
   code that generates a manual search prompt on a display device upon
   a failure to locate the font on the at least one server; and
   code that executes an application to perform a manual Internet search for the font.

7. The system of claim 3, further comprising:
   means for generating a manual search prompt on a display device upon a failure to locate the font on the at least one server; and
   means for executing an application to perform a manual Internet search for the font.

8. The method of claim 1, wherein the step of searching the at least one server to determine if the font is located on the at least one server further comprises the step of downloading a list of available fonts on the server from the server to the printer.

9. The method of claim 8, further comprising the step of identifying if the font is located on the at least one server by determining if the font is included in the available fonts on the list.

10. The program embodied on the computer readable medium of claim 2, wherein the code that implements the search of the at least one server from the printer further comprises code that downloads a list of available fonts on the at least one server from the at least one server to the printer.

11. The program embodied on the computer readable medium of claim 10, further comprising coda that identifies if the font is located on the at least one server by determining if the font is included in the available fonts on the list.

12. The system of claim 3, wherein the means for searching the at least one server to determine if the font is located on the at least one server further comprises means for downloading a list of available fonts on the at least one server from the at least one server to the printer.

13. The system of claim 12, further comprising means for identifying if the font is located on the at least one server by determining if the font is included in the available fonts on the list.

* * * * *

UNITED STATES PATENT AND TRADEMARK OFFICE
CERTIFICATE OF CORRECTION

PATENT NO. : 6,907,444 B2  
APPLICATION NO. : 09/954666  
DATED : June 14, 2005  
INVENTOR(S) : Sangeetha Narasimhan et al.

It is certified that error appears in the above-identified patent and that said Letters Patent is hereby corrected as shown below:

Column 9, Claim 2, line 52, delete "on" and insert therefor --one--

Column 10, Claim 4, line 26, after "Internet" delete "a"

Column 11, Claim 11, line 6, delete "coda" and insert therefor --code--

Signed and Sealed this

Twelfth Day of December, 2006

JON W. DUDAS  
*Director of the United States Patent and Trademark Office*